July 27, 1937.  H. L. KRAEFT  2,088,244
VELOCIPEDE CONSTRUCTION
Filed June 19, 1935   3 Sheets-Sheet 1
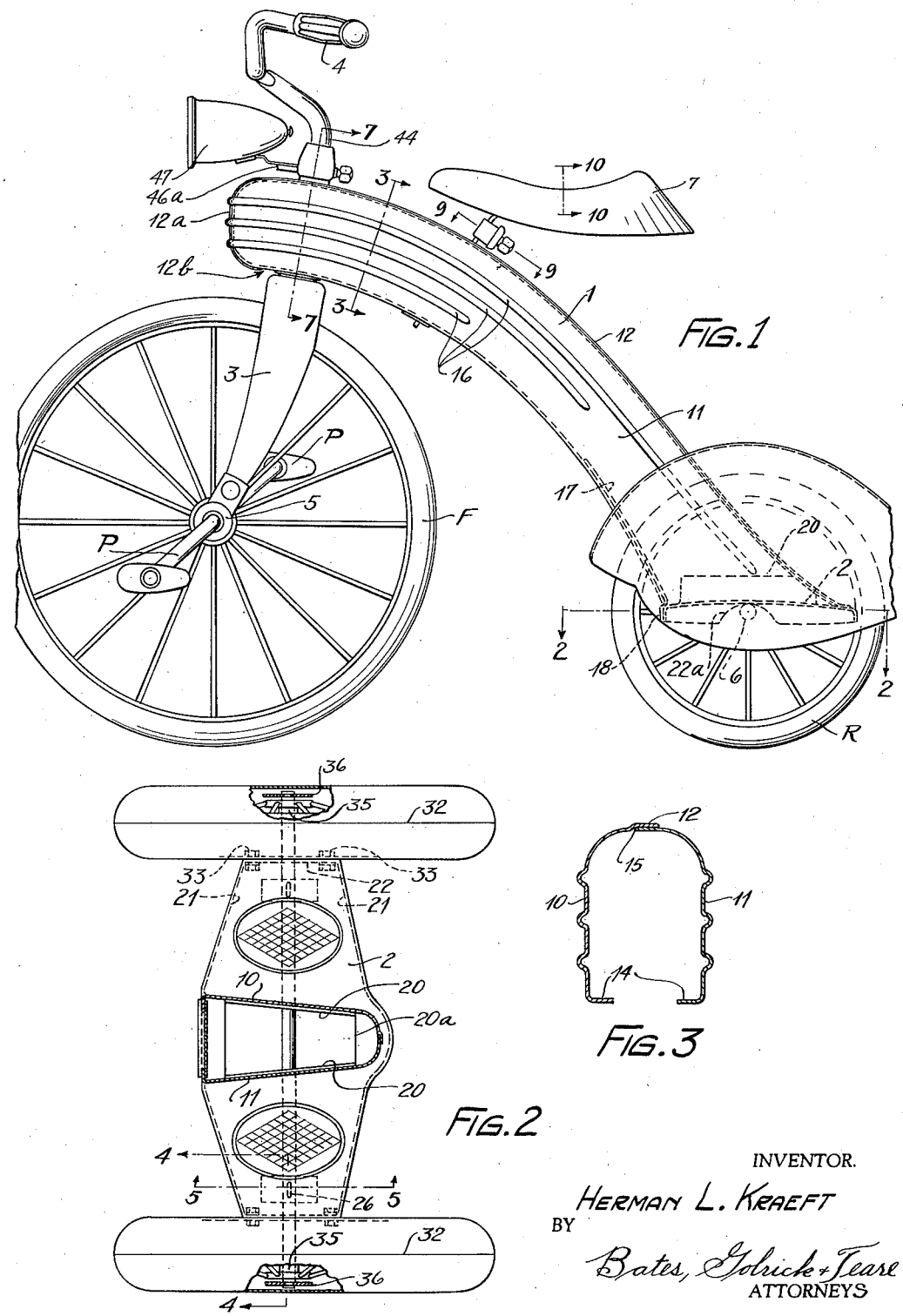
INVENTOR.
HERMAN L. KRAEFT
BY
Bates, Golrick & Teare
ATTORNEYS July 27, 1937.  H. L. KRAEFT  2,088,244
VELOCIPEDE CONSTRUCTION
Filed June 19, 1935  3 Sheets-Sheet 2
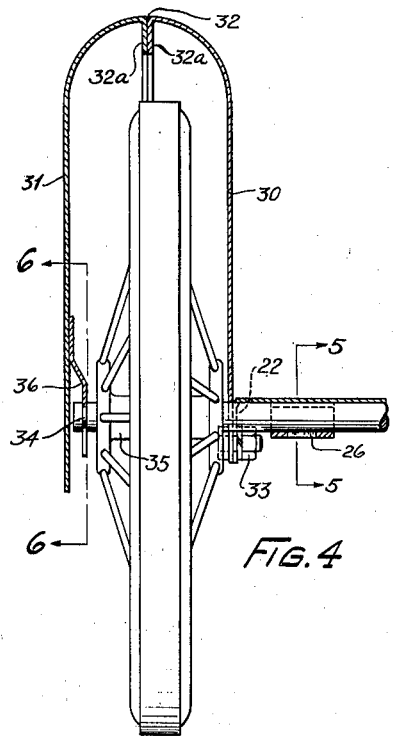
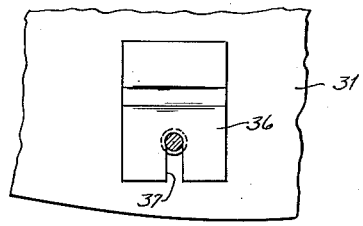
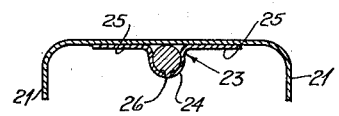
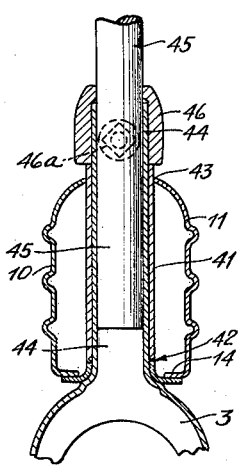
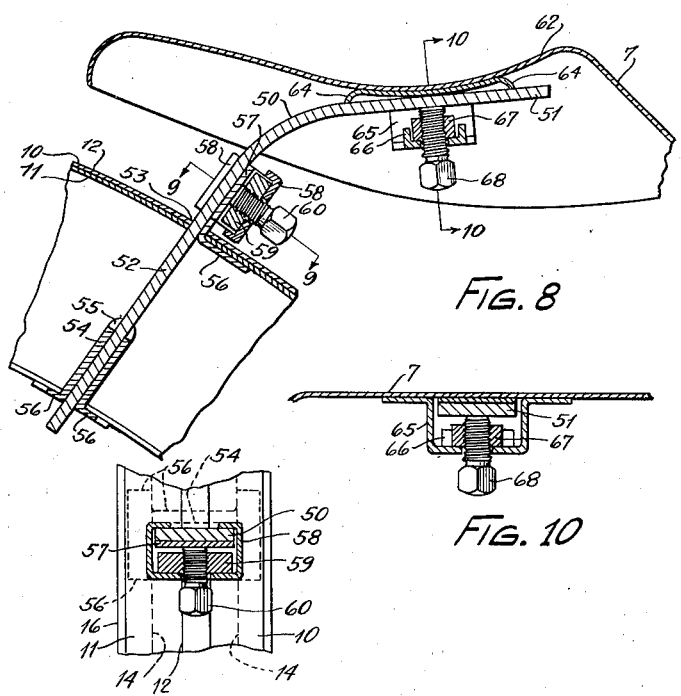
INVENTOR.
HERMAN L. KRAEFT
BY
Bates, Goldrick & Teare
ATTORNEYS.

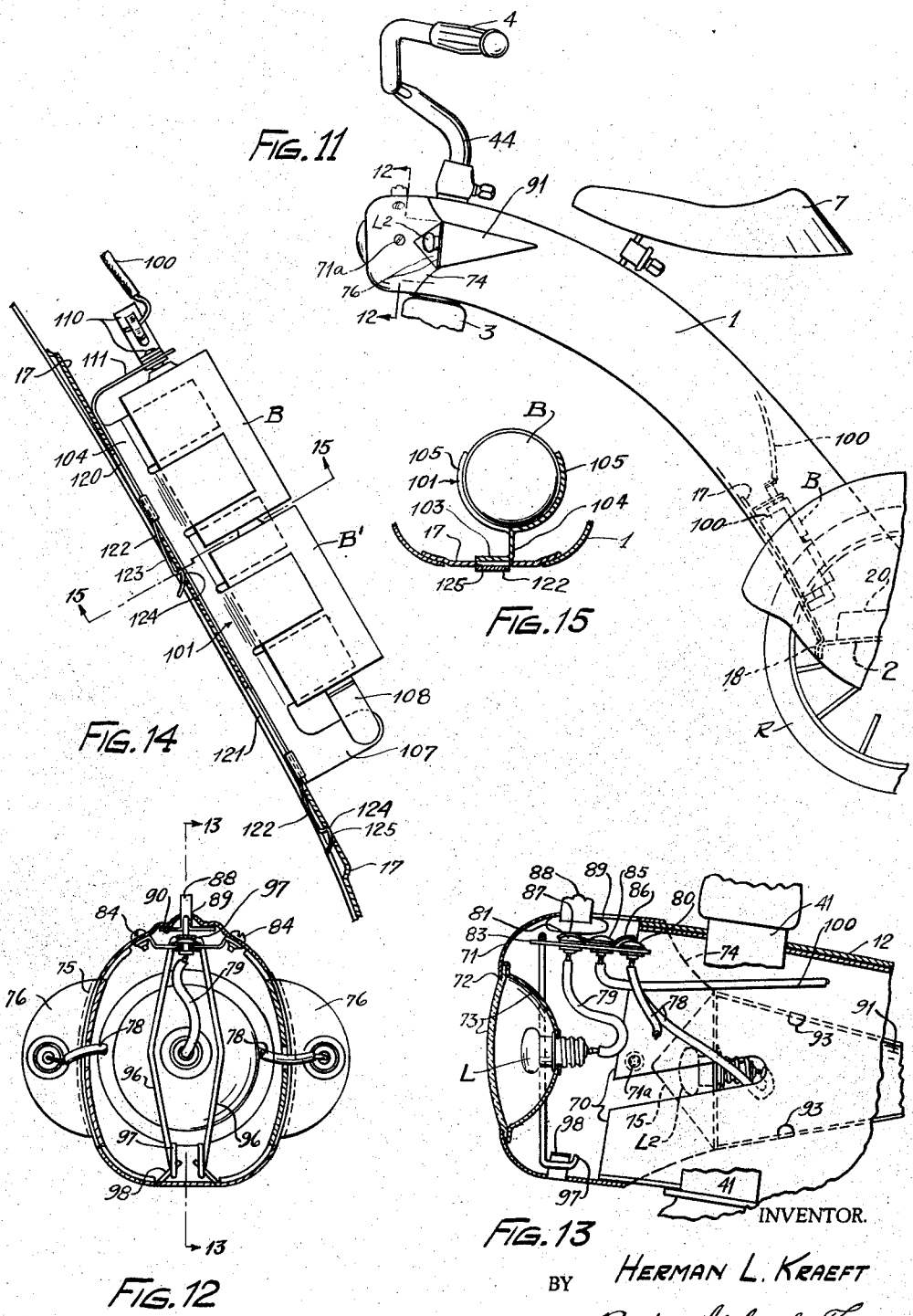

Patented July 27, 1937

2,088,244

UNITED STATES PATENT OFFICE 2,088,244

VELOCIPEDE CONSTRUCTION

Herman L. Kraeft, Cleveland Heights, Ohio, assignor to The Murray-Ohio Manufacturing Company, Cleveland, Ohio, a corporation of Ohio Application June 19, 1935, Serial No. 27,402

10 Claims. (Cl. 208—113)

The cycle construction herein shown constitutes an improvement in the type of construction disclosed and claimed in my prior application Serial No. 7,171, filed February 19th, 1935.

An object of the present invention is to provide a cycle frame, adapted to be made principally from sheet-metal at comparatively low cost, which frame will nevertheless be strong and rugged.

Further objects include the provision of an improved cycle frame, particularly in respect to the manner of mounting or supporting the necessary wheels, steering fork and saddle post.

A specific object is to provide a velocipede frame construction, facilitating the attachment and detachment of a wheel or wheels at one end of the frame.

Another specific object is to provide a stronger connection between the so-called back-bone and the rear wheel supporting cross-beam or platform of a velocipede, particularly wherein one or both of these parts of the structure is or are adapted to be made from sheet-metal.

A further object is to provide a simple, easily installed and serviced electric lighting system for a velocipede or cycle.

Other objects will appear hereinafter in connection with the following description of the preferred form illustrated herewith.

In the drawings, Fig. 1 is a side elevation showing the invention embodied in the velocipede; Fig. 2 is a sectional plan view of the rear portion of the frame, the plane of the section cutting the rear or lower portion of the back-bone being indicated by the line 2—2 in Fig. 1; Fig. 3 is a transverse sectional view, taken along the line 3—3 on Fig. 1, showing the construction of the back-bone at one portion thereof; Figs. 4 and 5 are fragmentary sectional views, taken in vertical planes as indicated by the lines 4—4 and 5—5, respectively, on Fig. 2, the plane of Fig. 5 being also indicated on Fig. 4; Fig. 6 is a fragmentary detail sectional view, showing the inner surface of a wheel fender and means associated therewith to hold a wheel in place on its axle; Fig. 7 is a fragmentary sectional view of the steering fork mounting, as indicated at 7—7 on Fig. 1, showing further details of construction of the frame; Fig. 8 is a central longitudinal fragmentary sectional view of the saddle post supporting portions of the frame and also a simple saddle construction; Figs. 9 and 10 are detail sectional views of the post and saddle construction as indicated by the lines 9—9 and 10—10 on Figs. 1 and 8; Fig. 11 is a fragmentary side elevation similar to Fig. 1, incorporating the preferred lighting system and apparatus; Fig. 12 is a transverse cross-sectional view of the head-light arrangement, as indicated by the line 12—12 on Fig. 11; Fig. 13 is a fragmentary central longitudinal sectional view of the head-light arrangement, as indicated by the line 13—13 on Fig. 12; Fig. 14 is a fragmentary longitudinal sectional view, showing a portion of the back-bone and battery supporting unit in position on a wall of said back-bone and Fig. 15 is a fragmentary transverse sectional view, as indicated by the line 15—15 on Figs. 11 and 14.

The principal parts of the velocipede illustrated are: the back-bone or main longitudinal frame member 1, the rear platform or wheel support 2, carrying the rear axle 6 and rear wheels R, the front wheel fork or mounting 3, which includes the handle bars 4 as part of its construction, as well as suitable bearing means 5 for the front wheel F. The drive, as shown, comprises a pedal and crank assembly P.

Referring to the back-bone, (see particularly Figs. 1 to 3 and Fig. 7), this comprises two complementary hollow halves 10 and 11 in telescoping relationship at a longitudinal seam 12. The seam 12 is formed by mutually superposed edge marginal portions of the shells 10 and 11, as shown particularly in Fig. 3. These marginal overlapping portions extend along the top of the back-bone, from the platform 2 for the entire length of the back-bone (interrupted, of course, by the saddle post and steering post, to be later described), and thence (in this embodiment) around the front closed end of the back-bone at 12a. The seam may continue underneath the closed end any desired distance. For all practical purposes the seam may terminate substantially at 12b.

The underside of the back-bone has inturned flanges 14, which are preferably spaced apart as shown in Fig. 3, along the entire underside of the back-bone. The spacing provides an opening sufficient to receive one of the electrodes necessary in order to spot or line weld the overlying flanges forming the seam 12. It should be mentioned that one of the flanges forming the seam 12 is offset from the general plane of the metal in order to provide a continuous shoulder 15 which the edge of the other flange portion abuts to determine i. e. maintain uniform width of the back-bone in assembly.

Suitable decorative ribbing is shown on the shells 10 and 11 at 16.

For reenforcing the underportion of the backbone, and closing as much of the gap formed between the flanges 14 as desired, there is a plate 17 integrally joined to the flanges 14, preferably lying inwardly from the flanges, the lower end of the plate 17 extending into face-to-face contact with the forward surface of the platform 2 as at 18. The platform is preferably downwardly flanged on all sides, as indicated at 21 and 22, the latter being the end flanges which are suitably cut away as at 22a (Fig. 1) to clear the axle. It will be seen that the back-bone and platform may be securely tied by welding the lower end of the plate 17 to the forward platform flange.

The plate 17 forms a convenient support for an electric battery casing or bracket and is especially adapted for this, as will be later described in connection with Figs. 14 and 15.

To further effect a strong connection between the rear or lower end of the back-bone and the transverse platform 2, I provide upstanding flanges 20 on the central web of the platform adapted to enter the open lower or rear end of the back-bone and extends in face-to-face relationship to the side walls thereof. These flanges 20 are preferably made by forming an opening as at 20a in the web of the platform and bending the metal of the web upwardly from the opening, this leaving a gap below the back-bone permitting the insertion of suitable electrodes both to effect welding of the flanges 20 to the side walls of the back-bone and to effect welding of the plate 17 to the inwardly extending marginal flanges 14.

As illustrated in Figs. 1, 2 and 4, the axle 6 underlies the web portion of the platform and extends beyond it at each end. The axle may be secured in place by sheet-metal clips 23, having generally cylindrically formed portions 24 embracing the axle and oppositely extending legs 25 adapted to be spot-welded e. g. to the underside of the platform. To prevent the axle from rotating, the same may be provided with nibs 26, adapted to extend through complementary slots in the generally cylindrical portions 24 of the clips.

Alternatively, the axle may be removably suspended from the underside of the platform or axle beam, as by a bracket arrangement such as shown and claimed in my prior application, Serial No. 7,171; (not shown herein).

The flanges 22 e. g. at the outer ends of the platform carry sheet-metal fender members, which extend in shrouding relation to the wheels, portions of the fenders extending into endwise overlying relationship to the axle as shown in Figs. 1 and 4. The fenders may comprise generally complementary shell members 30 and 31, secured together along a median seam at 32, as by welding together inturned flanges 32a of the respective shells. The inner shells 30 may be removably secured to the end flanges 22 of the platform, as by appropriate bolts and nuts 33, (see Figs. 2 and 4).

To assemble the rear wheels and axle, the wheels are slipped over the outwardly projecting ends of the axle and the fenders then attached as above described. The ends of the axles are peripherally grooved, as at 34, beyond the wheel hubs 35 and suitable sheet-metal brackets 36, secured as by welding to the inside surfaces of the outer fender walls 31, have slots 36, one being shown in Fig. 6, which embrace the axle ends and lie in the grooves 34, thereby both securing the wheels in place and providing outer supports on the axle for the fenders. The latter function is important, because the users often stand on the fenders in coasting.

It may be mentioned that, by virtue of the devices 34—36, where the axle is adapted to be removably supported on the platform, as illustrated in my co-pending case, the fender members may be non-detachably secured to or left on the platform during assembly of the wheels and axle onto the vehicle and removal therefrom; the wheels being assembled on the ends of the axle, and the axle then being secured by such removable brackets. In any event, the devices 36 enter the grooves 34 to retain the wheels and support the fenders.

Referring now to the front fork supporting construction, (see particularly Figs. 1 and 7), the inturned flanges 14 of the back-bone sections 10 and 11 are connected by a continuous flange 40 which is integral with a tube 41, as by being welded to it at 42, the upper end of the tube projecting from the top surface of the back-bone through an appropriate opening 43 formed by circularly cut-away portions of the upper walls of the back-bone sections. This flanged tube forms a swivel support for the fork 3, the upper end of which is tubular, as at 44, and substantially fits the inside of the tube 41.

The upper end of the tubular fork portion 44 is split in the usual manner (not shown) and receives the lower end of the steering column member 45 of the handle bar assembly, and the parts 44 and 45 are clamped together, there being a ring 46 embracing the tube 44, provided with a set screw 46a, the inner end of which bears on the tubular portion 44.

The ring 46 may have, integral therewith, a forwardly extending bracket 46a, to which a suitable head lamp 47 may be secured in convenient fashion.

Referring now to the saddle post supporting arrangement, Figs. 8, 9 and 10, the post, as shown, preferably comprises a section of spring steel 50 of generally rectangular shape, having a generally horizontal portion 51 above the back-bone on which the saddle is carried and a diagonally downwardly extending portion 52 entering the back-bone through a rectangular opening 53, which cuts the seam 12 and both top wall portions of the shells 10 and 11.

The downwardly extending portion 52 of the post has upper and lower bearing supports on the back-bone, one inside and one outside of the back-bone assembly.

The support for the lower end of the post comprises a generally U-shaped sheet metal bracket 54, the inner surfaces of the legs of which are properly spaced to embrace and support the post, permitting considerable vertical adjustment thereof without disengaging the bracket. An opening is formed as at 55 in the closed end of the U as by milling across the same and forming a slot which is closed adjacent both narrow edges of the post. The shape of the bracket 54, when viewed in plan, is shown in Fig. 9 only (in broken lines). It will be noted that the side portions of the brackets are flanged outwardly as at 56 underlying the inturned flanges 14 of the back-bone, the flanges of the bracket being rigidly secured thereto by appropriate means, welding, e. g.

The upper support for the saddle post comprises an L-shaped bracket 56, secured to the upper wall of the back-bone, as to both shells 10 and 11—, an arm 57 of the bracket extending upwardly through the rectangular opening 53 into forwardly abutting contact with the rear side of the post. The arm 57 may be clamped to the post by a generally C-shaped clip 58 (see Fig. 9), this being arranged to non-rotatively embrace and support a nut 59 for a set screw 60 extending through a rear opening in the clip 58, thence through the nut and into engagement with the rear face of the arm 57.

The saddle is carried on the top side of the rearwardly extending arm 51 of the post by a clamping arrangement, somewhat similar to that just described, which secures the post to the back-bone. The saddle proper may comprise (i. e. include) a one-piece stamping 62 on the underside of which, centrally thereof, is a spring steel leaf 63, the central portion of which is downwardly bowed to rest on top of the post extension 51. The ends of the leaf spring are turned downwardly as at 64, to abut the top surface of the post extension. A hollow bracket 65 is secured to the underside of the saddle, embracing both the seat post portion 51 and the spring 63, as shown in Fig. 10; and the portion of the bracket which underlies the post extension and spring is adapted as by reason of upstruck tongues 66 to non-rotatively embrace a nut 67 for a clamping screw 68, the operation of which is obvious from Figs. 8 and 10, and the above description. The saddle may thus be adjusted along the rearward extension of the post and the post may be slid up and down in its bearing supports and be securely locked in adjusted position.

Referring now to Figs. 11 to 15, inclusive, the modification there shown is principally in relation to the lighting system. This may comprise a central light having a bulb L and paired side lights with bulbs L'; the latter having no lenses or reflectors, as illustrated.

In adapting the main frame for this particular lighting arrangement, both shells 10 and 11 of the back-bone may terminate as at 70, Fig. 13, the forward closure for the back-bone being in such case effected by a separate cup-shaped casting 71, supporting the bulbs, contacts, switch, etc. of the lighting system.

The casing 71 may be retained on the forward end of the back-bone in closing relation to it, simply by friction, or suitable oppositely positioned screws 71a may be provided, as suggested in Fig. 11; the screws entering suitable threaded openings in the side walls of the back-bone.

The front wall of the casing 71 has a central opening 72 for supporting a conventional lens and reflector assembly 73 for the bulb L, supported in place, as will be hereinafter described. The continuous side wall of the casing 71 has rearward extensions 74, one at each side, the rear portions of which may be turned outwardly to form apertured flanges for supporting the "parking" light bulbs. As shown, however, separate brackets 75 are secured in face-to-face relationship with the extensions 74, these brackets having outstanding ears 76, centrally apertured to receive the threaded shanks of the light bulbs and make "ground" contact therefor with the cycle frame. The bulbs L' in the form shown are not provided with reflectors or lenses.

The center terminals of both bulbs L' and the center terminal of the bulb L are suitably connected, as by insulated wires 78 and 79, respectively, with switch terminals 80 and 81 insulatingly mounted on a cross strip 83, within the shell 71, and carried as by a pair of screws 84, see Figs. 12 and 13. The ends of the wires 78 and 79 may be simply soldered to the respective light bulb center contacts and the respective contact elements 80 and 81, but more elaborate screw or spring clip attachments (not shown) may be provided, as desired.

Mounted on the strip 83 in line with the terminals 80 and 81 is an electric switch terminal 85, connected with an electric current supply wire 100, the terminal 85 being likewise insulated from the metal of the frame, (from the strip 83 e. g.). The terminal 85 may comprise a bolt or rivet, the head of which secures a spring leaf having rearwardly and forwardly extending arms 86 and 87, which normally lie in slightly spaced relation to the contacts 80 and 81, respectively.

The arms 86 and 87 are arranged to be selectively depressed against the contacts 80 and 81 by a sliding switch member or button 88, mounted to ride in a slot 89, in the top of the casing 71. This switch member 88 has suitable lateral extensions 90 underlying the metal of the shell at the margins of the slot to prevent withdrawal of the switch member from the slot and to hold the button in operative relation to the arms 86 and 87 when moved back and forth. When the switch member is in the position shown in Fig. 13, the lower surface of it presses downwardly on the spring arm 87 and turns on the bulb L and when drawn back toward the rear end of the slot the arm 86 is depressed to turn on the side or "parking" lights L'. The source of current, to be presently described, is, of course, grounded to the frame to complete the electrical connections.

The brackets 76 forming the side light mountings may be given a more finished appearance by the use of suitable sheet metal shells 91 attached to the side walls of the back-bone in buttressing relation to the outstanding ears of the brackets. These shells are semi-conical, and their forward ends correspond generally to the shape of the ears, (shown in Fig. 12) and the shells decrease in cross-section toward the rear, as suggested in Figs. 11 and 13. The semi-conical shells 91 receive the ends of the wires 78 through slots 92 in the back-bone side walls (see Fig. 13) and the shells may be secured to the side walls 10 and 11 by suitable lugs 93 on the inner edges of the sheet metal forming the shells; the lugs extending through small openings in the side walls 10 and 11 and being bent over on the inside surfaces of said walls.

For supporting the reflector and light bulb assembly 73, within the shell 71, a spring wire retainer 96 in the general shape of a bow-legged hairpin is shown in Figs. 12 and 13. The closed upper end 97 of the retainer is adapted to be hooked over a central forward extension of the cross-strip 83 and the two legs of the retainer are appropriately shaped, being hooked as shown at 97, to engage ears 98 extending upwardly toward each other from the lower wall of the shell 71, and preferably formed from the metal thereof. Connecting stretches of the fastener engage the rear side of the reflector lens assembly, holding the same firmly in place at the central opening 72 of the casing 71. The fastener insures "ground" connection between the bulb L and the frame through the metal reflector. In order to release the reflector-lens assembly it is merely necessary to press the two free ends of the wire together, and move them in a rearward direction, relative to the shell 71, thereby detaching the hooked end portions 97 from the lugs 98.

The supply wire 100 connected with the switch terminal 85 leads through the hollow back-bone to one terminal of a suitable battery, the other battery terminal being grounded to the frame.

The battery is conveniently mounted on the closure plate 17 of the back-bone construction, previously described, and the mounting is shown in detail in Figs. 14 and 15. The battery may comprise dry cells B and B', supported by a sheet metal bracket 101, having a base 103 and an upright wall or web 104, from which cylindrically formed arms 105 are bent alternately, one in one direction and the adjacent one in the opposite direction, thus forming a generally cylindrical clasp for the dry cells. At the rear end of the upright wall 104 is an upstanding bracket 107, to which a spring terminal 108 is suitably connected. The latter presses forwardly against the adjacent end wall of the cell B' and grounds the battery. The cell B' has its central pole in contact with the end wall of the adjacent cell B and the latter has its center pole in contact with part of a conventional spring terminal or clip 110 insulatingly carried on an upstanding spring arm 111 of the bracket. The wire 100 is suitably connected with the clip 110.

As a suitable detachable mounting for the bracket 101, the plate 17 has apertures at 120 and 121 underlying the base 103 of the bracket, and these apertures are, in effect, of sufficient longitudinal extent to receive spring clips 122 of mutually similar construction riveted or otherwise securely fastened to the base 103. The clips have arms 123 with nose portions 124 adapted to be sprung over crossing portions of the plate 17, so as to enter smaller openings 125 in the plate 17. By this arrangement the battery support may be attached to the plate by setting it down on the plate with the arms 123 aligning with respective openings 120 and 121 and then bodily shifting the support to cam the nose portions of the arms 123 under the bridging portions of the plate 17, so that these nose portions will enter respective openings 125. The battery support is detached, by just the opposite procedure, as will be obvious from Fig. 14.

Servicing of the lighting system, as in making connections between the conductor wires, switch elements and bulbs, requires taking off the casing 71. To provide sufficient access to the interior of said casing, the battery casing is ordinarily disconnected, and allowed to slide upwardly along the plate 17, as pulled by the wire 100, as far as necessary in order to gain the desired access into the shell 71 to make the connections, after which the battery support is easily reattached to the plate.

I claim:

1. A velocipede frame construction comprising two hollow sheet metal members joined together longitudinally of the tricycle to form a hollow back-bone, said back-bone being open at one end, a sheet metal platform adapted to support the rear wheels of the vehicle, said platform extending across said open end of the back-bone, having a flange extending into the interior of the back-bone in face-to-face relation to one of said sheet metal members, and rigidly secured thereto.

2. In a velocipede, a hollow sheet metal back-bone having a generally horizontal portion with an aperture in its top wall, an apertured bracket materially below the aforesaid aperture and in alignment therewith, said bracket being secured to opposite portions of the back-bone, said apertures being adapted to slidably receive a saddle post, and means rigidly secured to the back-bone and adapted to clamp such saddle post in vertically adjusted position in said apertures.

3. In a velocipede, a hollow sheet metal back-bone having an upper wall and an aperture therein adapted to receive a saddle post, said back-bone being generally open on its under side, an inverted U-shaped bracket arranged to bridge said open under side of the back-bone and extend upwardly into the interior thereof, and an opening in the upper portion of the U in alignment with said aperture for receiving the lower end of such saddle post between the arms of the U.

4. In a tricycle, a hollow sheet metal back-bone member adapted for supporting front and rear wheels, an opening in the top wall of said member adapted to receive a saddle post, a bracket secured to the back-bone and having an arm extending adjacent such post, a clip adapted to surround the post and the upwardly extending arm, said clip having means thereon to non-rotatively embrace and support an internally threaded nut, and a clamping screw engaging the threads of said nut and bearing on said upwardly extending arm to clamp the arm and post together.

5. In a velocipede, a longitudinal back-bone and a transverse wheel supporting beam rigid therewith adapted to support a rear wheel axle beneath it, means secured to the beam and adapted to outwardly overhang a wheel on said axle, said means having an open ended slot adapted to detachably engage such axle beyond the wheel in a manner to retain the wheel.

6. In a cycle frame, a hollow sheet-metal back-bone, generally open on its underside and having oppositely directed inturned flanges, and a plate forming a bottom closure for the rear portion of the back-bone, the side marginal portions of the plate being secured to said inturned flanges, the rear end of the plate extending beyond the back-bone for face-to-face contact with a wheel supporting platform and being adapted to be rigidly secured thereto.

7. In a cycle, a back-bone made of sheet-metal, closed on its top side and having inwardly extending spaced flanges on its underside, a tube adapted to support a steering fork, said tube being disposed at the front end of the back-bone having a substantially continuous flange at its lower end overlapping aforesaid flanges and secured rigidly thereto, and an opening in the top wall of the back-bone receiving the upper end of the tube.

8. As an article of manufacture, a backbone member for a velocipede comprising two curved channel shaped sheet metal shells, with relatively wide upper flanges assembled in mutually overlapping relationship, and relatively narrow lower flanges spaced apart a sufficient distance to freely receive a welding instrument between them, the depth of the hollow beam thereby formed being materially less than twice the horizontal width of the beam so that a relatively short welding instrument may be inserted between the spaced narrow flanges and applied to the overlapping flanges inside the beam.

9. A velocipede backbone, comprising two hollow, elongated, sheet-metal shells of channel shape adapted to form, when assembled, a hollow elongated beam, a flange of one shell having a marginal flange portion offset from the plane of the sheet-metal of the flange to provide a shoulder surface longitudinally of the beam, and a flange of the other shell having its longitudinal marginal portion extending in face-to-face contact with said marginal flange portion, and secured rigidly thereto, with its edges in abutting relation to the shoulder, the other two flanges of the channel shaped shells being spaced apart and lying on the under side of the beam, and separate means rigidly connecting said flanges near the end portions of the beam.

10. In a cycle frame, a back-bone comprising two substantially complementary channel shaped sheet metal shells having mutually overlying top marginal flange portions rigidly secured together to form a hollow beam, and inwardly extending lower flanges which are spaced apart, and a plate forming a bottom closure for the back-bone, the side marginal portions of the plate overlapping the inwardly extending flanges and being secured rigidly thereto.

HERMAN L. KRAEFT.